March 18, 1969  F. J. MEYER  3,432,931
MEASURING ARRANGEMENT
Filed April 26, 1966

Inventor
Franz Josef MEYER

By Spencer & Kaye
Atty

United States Patent Office 3,432,931
Patented Mar. 18, 1969

3,432,931
MEASURING ARRANGEMENT
Franz Josef Meyer, Opladen, Germany, assignor to Goetzewerke Friedrich Goetze A.G., Burscheid, Germany
Filed Apr. 26, 1966, Ser. No. 545,331
Claims priority, application Germany, May 6, 1965, G 43,522
U.S. Cl. 33—169
Int. Cl. G01b 5/02
4 Claims

ABSTRACT OF THE DISCLOSURE

Measuring arrangement for determining the thickness of chrome plating on piston rings. A reciprocally movable carriage is centered on a piston ring, the plating of which is to be measured, and measuring means on the carriage is biased into contact with such piston ring to take the desired measurement. The carriage is reciprocally moved by pneumatic drive means provided therefore via a pivotable member mounted on the frame supporting such carriage.

---

The present invention relates generally to the automatic measuring of layer thicknesses, and more particularly the electrical measuring of the thickness of a chromium layer deposited on the bearing surface of a piston ring.

Generally, the measuring of the chromium layer thickness on the bearing surface of a piston ring is performed manually. For example, in one prior electronic arrangement for measuring the chromium layer thickness, the measuring transducer is stationary and the article being tested is manually placed against the probe of the transducer and is rotated thereagainst, so that the thickness of the layer is measured at different points. This method of measuring the thickness is time consuming and suffers from the usual drawbacks incident to manual processes.

Even though these drawbacks were present, it was thought that, due to the circular shape of the article being tested and the fact that the measurement had to be carried out at several places along the circumference of the article, there was no way of avoiding the individual manual testing. The reason for this being that mechanical devices for taking the article being tested from a pile of such articles and for placing the article against the transducer probe and for rotating the same while it was in contact with the probe would be too complicated structurally, and would itself be a source of too many errors. One of the sources for error in such structures is that the probe tips of the transducer are quickly worn down if the articles being tested are not, prior to and subsequent to the measuring process, sufficiently lifted from the probe as a consequence of which, the articles being tested rub against the probe tips while the articles are being moved toward the probe, away from the probe, or rotated against the probe.

It is therefore an object of the present invention to provide a method and apparatus for automatically measuring the thickness of chromium layers on piston rings.

With this object in mind, the present invention resides in the manner in which the measurement of the layer thicknesses on piston rings is accelerated and improved in that the transducer probe is brought against each article being tested. However, before the transducer probe is brought against the article, the article is held by a centering mechanism which is advanced and lifted in synchronism with the transducer probe, with each article being measured being released after the measuring process.

According to a feature of the present invention, a plurality of measuring probes are provided for engaging the article being tested simultaneously at different points about its periphery, thereby permitting ring shaped articles to be tested quickly and in a manner in which the probe tips are subjected to only a minimal amount of wear.

Additional objects and advantages of the present invention will become apparent upon consideration of the following description when taken in conjunction with the accompanying drawings in which.

Figure 1:
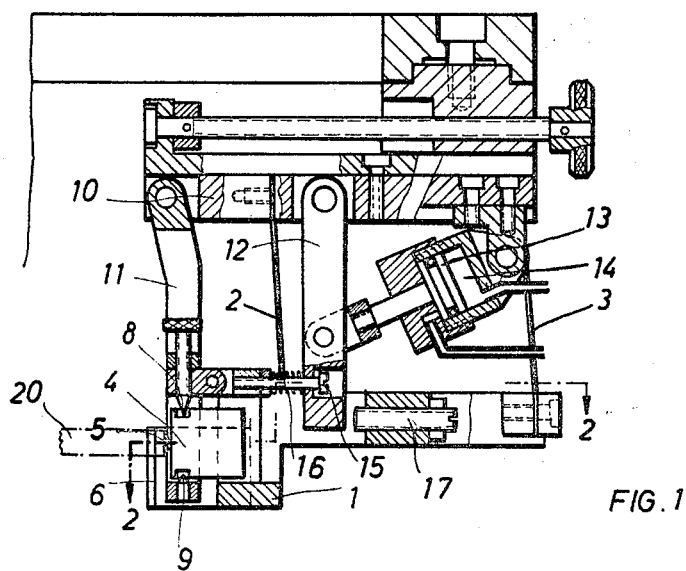
FIGURE 1 is a cross-sectional view through a portion of a measuring device according to the present invention.
Figure 2:
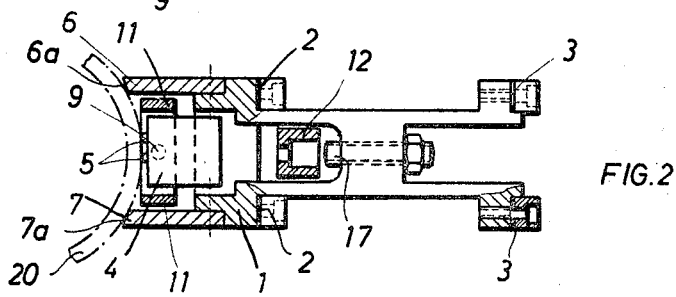
FIGURE 2 is a partial cross-sectional view taken along line 2—2 of FIGURE 1.
Figure 3:
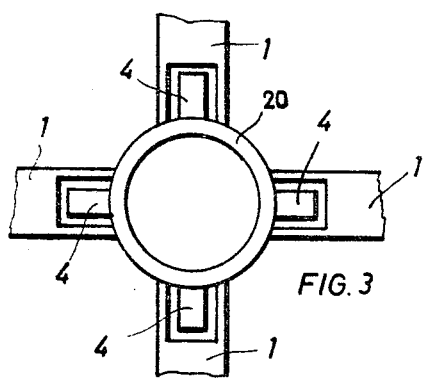
FIGURE 3 is a diagrammatic bottom plan view of a measuring arrangement according to the present invention.

Referring now to the drawings, there is shown in FIGURE 1 an automatic measuring apparatus for measuring the thickness of a layer of chrome on a piston ring 20 shown in dashed line, the apparatus being provided with a plurality of measuring devices as shown diagrammatically in FIGURE 3. However, for the sake of clarity, FIGURE 1 shows only a single measuring device and the apparatus will be described with respect thereto. More particularly, the measuring device comprises a carriage 1 which is suspended from a plurality of leaf springs 2 and 3 and a transducer 4 having measuring probe tips 5, the transducer being cylindrical in shape. As shown in FIGURE 2, the leaf springs are disposed on either side of the carriage and the carriage is provided with projections in the form of centering bars 6 and 7 which are arranged on either side of the transducer 4. Each of the centering bars is provided with a bevelled edge 6a and 7a, respectively, which contacts the article to be measured.

The measuring device also includes two elongated members 11 and 12 which are pivotably connected at one end to the upper portion 10 of the measuring apparatus and which forms a frame for the apparatus. The member 11 is provided with a lower portion wherein the transducer 4 is carried and as shown in FIGURE 1, the member 11 is also provided with screw-like elements 8 and 9 which position the transducer within the member and which permits the transducer to very gently come to rest against the article being tested. The member 12 serves as a means for moving the carriage 1 via a pneumatic drive incorporating a piston 13 connected to the member 12. The piston is arranged in a cylinder 14, with the arrangement being such that the movement of the piston effects the movement of the carriage and the tensioning of the leaf springs 2 and 3. As further shown in FIGURE 1, a reciprocating bar 15 is connected to the member 11 and is slidably mounted within the member 12. A compression spring 16 surrounds the member 15 and biases the member 11 so as to cause the probe tips 5 for the transducer 4 to bear against the article being tested. As to the operation of the transducers see "Zeitschrift für Metallkunde," 1963, No. 6, pp. 339 et seq.

The operation of the measuring apparatus according to the present invention is such that after the article being tested is lifted in front of the bars 6 and 7, the carriage 1 is brought against the article being tested due to the influence of air pressure from the cylinder 14 and the tension of springs 2 and 3, until the article being tested is grasped and held by the centering bars 6 and 7. That is, as previously mentioned, a plurality of these measuring devices are present in the apparatus and are preferably positioned in a circular arrangement. Therefore as the article is lifted into the measuring zone, the bevelled edges 6a and 7a of each of the centering bars contact the circular article and due to the pressure of the carriage 1 hold the article in place. Then, due to the member 12 being held in place by the positioning of the piston 13, while the member 11 may be freely pivoted, the compression spring 16 acts against the member 11 and causes this member to be pivoted so as to bring the probe tips 5 of the transducer 4 into contact with the article to be tested. It is noted, that the movement of the member 11 is determined by the connecting bar 15, that is the position of bar 15 within the member 12. After the measurement has been obtained, the article being tested is then released by movement of the piston 13 which pulls the carriage away from the article being tested.

With regard to the movement of the carriage, it should be noted that the elongated member 12 is disposed within an opening in the carriage as shown in FIGURE 2. Since the member 12 is connected to the piston 13, the movement of the piston to its upper position causes the member 12 to contact a bar 17 mounted on the carriage and thus moves the carriage against the force of springs 2 and 3 and tensions these springs. When the article to be tested is placed in the measuring zone, the piston 13 is moved to its lower end position as shown in FIGURE 1, with the centering bars 6 and 7 contacting the article to be tested. When the centering bars contact the article the leaf springs 2 and 3 provide the centering and holding pressure necessary for maintaining the article in the proper position. Thus, as shown in FIGURE 1, even though the centering bars contact the article and thereby inhibit further forward movement of the carriage, the connecting rod under the influence of the piston 13 continues to move forward and disengages from the rod 17, with the movement of the transducer 4 being carried out as explained above.

It will thus be seen, in accordance with the present invention, there is provided a measuring device having two centering bars which are arranged on either side of the transducer probe which is moved into contact with the article being tested and the two bars serving to center the article before the measuring operation. The centering bars are connected with the carriage which is suspended from leaf springs and which also delivers the centering pressure required for the bars to engage the articles to be measured. The measuring device is further provided with a spring for providing the measuring pressure, which spring is independent of the suspension system and the feed means for the carriage, that is, a spring which after the centering bars have contacted the article to be tested, moves the transducer over the short remaining distance and brings the probe thereof into contact with the article being tested with the small degree of pressure necessary for carrying out the measurement. After the measurement has been obtained, the leaf springs, together with the carriage, the transducer, and the centering bars are raised from the article being tested, which article is then, in a manner well known per se, automatically exchanged for the next ring being tested. Thus, according to the present invention there is provided a measuring apparatus wherein there is little danger that the probe tips of the transducer will rub against or wear themselves down against the hard chrome layer of the piston ring which has just been tested or the piston ring which is to be tested next.

It will be understood that the above description of the present invention is susceptible to various modifications, changes, and adaptations, and the same are intended to be comprehended within the meaning and range of equivalents of the appended claims.

What is claimed is:
1. An arrangement for automatically measuring the thickness of layers, and preferably the electrical measuring of the thickness of a chrome layer on the bearing surface of a piston ring, comprising in combination:
   carriage means reciprocally movable with respect to a piston ring to be measured;
   projecting means provided at one end of said carriage means for contacting and centering the piston ring to be measured;
   means for supporting said carriage means and for biasing said projecting means of said carriage means into contact with the piston ring for centering the ring;
   means cooperating with said carriage means for contacting the piston ring to be measured and for measuring the thickness of the chrome layer thereof;
   spring means cooperating with said measuring means for biasing said measuring means into contact with the piston ring to be measured, said spring means being independent of said support means and the movement of said carriage means into contact with the piston rings;
   frame means, said frame means having said support means for said carriage means connected thereto; and
   means for reciprocally moving said carriage, said means including a pneumatic drive means, a first member pivotably mounted on said frame and having a portion thereof for contacting said carriage means to move said carriage means, said first member being connected to said pneumatic drive means whereby the movement of the pneumatic drive means is transferred to said carriage means via said first member.

2. An arrangement as defined in claim 1 wherein said means for measuring the thickness of the chrome layer of the piston ring includes a transducer, and a second member for carrying said transducer and for moving said transducer into contact with the piston ring after the ring has been centered by said projecting means.

3. An arrangement as defined in claim 2 and further including rod means coupled to said first and second connecting members, said rod means having said spring means cooperating with said measuring means arranged thereon.

4. An arrangement as defined in claim 3 wherein said means for supporting said carriage means and for biasing said projecting means are leaf springs.

References Cited

UNITED STATES PATENTS

| 1,648,497 | 11/1927 | Moore et al. |
| 2,190,306 | 2/1940 | Balsiger. |
| 2,739,389 | 3/1956 | Carter. |
| 2,913,829 | 11/1959 | Arlin. |
| 3,305,932 | 2/1967 | Iselin. |

FOREIGN PATENTS

| 229,751 | 10/1963 | Austria. |
| 904,116 | 2/1945 | France. |

OTHER REFERENCES

Publication: American Instrument Co., Bulletin 2150, pp. 2, 3 and 7, Sept. 1, 1948, 33/172F.

HARRY N. HAROIAN, *Primary Examiner.*